United States Patent [19]
Zang

[11] Patent Number: 5,558,443
[45] Date of Patent: Sep. 24, 1996

[54] SHAFT SEAL FOR HYDRODYNAMIC BEARING UNIT

[75] Inventor: Yan Zang, Milpitas, Calif.

[73] Assignee: Quantum Corporation, Milpitas, Calif.

[21] Appl. No.: 503,794

[22] Filed: Jul. 18, 1995

Related U.S. Application Data

[63] Continuation-in-part of Ser. No. 363,566, Dec. 22, 1994, which is a continuation-in-part of Ser. No. 278,803, Jul. 22, 1994, abandoned.

[51] Int. Cl.$^6$ ..................................................... F16C 33/72
[52] U.S. Cl. .................. 384/112; 384/107; 384/119; 384/130
[58] Field of Search .................................. 384/112, 107, 384/119, 124, 123, 130

[56] References Cited

U.S. PATENT DOCUMENTS

| | | | |
|---|---|---|---|
| 3,778,123 | 12/1973 | Hendler et al. | |
| 4,726,693 | 2/1988 | Anderson et al. | 384/114 |
| 4,795,275 | 1/1989 | Titcomb et al. | 384/107 |
| 4,892,418 | 1/1990 | Asada et al. | 384/124 |
| 5,067,528 | 11/1991 | Titcomb et al. | 141/4 |
| 5,112,141 | 5/1992 | Asada et al. | 384/100 |
| 5,112,142 | 5/1992 | Titcomb et al. | 384/107 |
| 5,141,338 | 8/1992 | Asada et al. | 384/114 |

*Primary Examiner*—Lenard A. Footland
*Attorney, Agent, or Firm*—David B. Harrison

[57] ABSTRACT

A seal for a hydrodynamic bearing unit having a shaft and a sleeve includes a seal ring secured to the shaft and extending radially outwardly of the pair of spaced-apart hydrodynamic journal bearings defined between the seal ring and a thrust plate. The seal ring adjacently faces adjacent radial and axial portions of the sleeve. An annular taper capillary seal is defined between a diverging outer wall surface of the seal ring and the adjacent axial portion of the sleeve. A containment ring extends from the sleeve to surround a radial wall portion of the seal ring adjacent to an opening of the taper capillary seal and forms a secondary containment seal opening toward the shaft for preventing escape of the hydrodynamic bearing lubricant. The hydrodynamic lubricant is placed within the annular taper capillary seal and is retained in place by capillary force in the absence of rotation, and is retained in place by capillary force and by centrifugal force in the presence of relative rotation between the shaft and the sleeve.

11 Claims, 2 Drawing Sheets

SHAFT SEAL FOR HYDRODYNAMIC BEARING UNIT

REFERENCE TO RELATED PATENT APPLICATIONS

This is a continuation-in-part of U.S. patent application Ser. No. 08/363,566 filed on Dec. 22, 1994, entitled "Self-Contained Hydrodynamic Bearing Unit", which is a continuation-in-part of U.S. patent application Ser. No. 08/278,803 filed on Jul. 22, 1994, entitled "Self-Contained Hydrodynamic Bearing Unit", abandoned.

SUMMARY OF THE INVENTION

The present invention relates to hydrodynamic bearings. More particularly, the present invention relates to an improved seal for a hydrodynamic beating unit adapted e.g. for use within a rotating cantilevered disk spindle of a reduced-height hard disk drive.

BACKGROUND OF THE INVENTION

The development of computer hard disk drives demands ever increasingly higher track density, lower acoustic noise, and better reliability under shock and vibrational disturbances. The undesirable characteristics of the currently used ball beating spindles, such as high non-repetitive runout, large acoustic noise, and high resonance frequencies due to bearing defect, impose severe limitation on the drive's capacity and performance.

The use of a non-contact bearing, such as a hydrodynamic bearing ("HDB"), may overcome the aforementioned limitation. The full film lubrication of a fluid bearing displays significantly lower non-repetitive runout and acoustic noise, and its higher damping provides better resistance to external shock and vibration. One example of a disk drive spindle motor including a HDB and centrifugal-capillary seals is found in the present inventor's (with other co-inventors) U.S. Pat. No. 5,423,612 entitled: "Hydrodynamic Bearing and Seal", the disclosure thereof being incorporated herein by reference.

The deployment of the HDB system in a hard disk drive environment requires that the lubricant be securely sealed inside of the bearing structure under all operating and non-operating conditions in order to prevent performance degradation of the bearing and contamination in the drive. At the same time, the bearing system needs to be easily manufacturable in order to satisfy cost requirements. As explained below in connection with FIG. 1, these requirements often come into conflict with each other and have heretofore resulted in compromised HDB spindle designs.

Prior approaches in the design of lubricant seals for self-contained hydrodynamic bearing units include surface tension or capillary seals and/or traps, ferromagnetic seals, flow recirculation passages, spiral or herringbone pumping grooves and global flow recirculation of lubricant driven by the centrifugal force and pumping grooves resulting from relative rotation of the components comprising the bearing unit.

Capillary taper seals have been shown to be effective when the bearing unit is at rest (except in response to shock forces which causes the lubricant's surface to break down and lubricant to be lost as droplets). However, capillary sealing force is relatively weak compared to the dynamic pressure build-up inside of the bearing as well as to potential imbalanced pumping as may result from manufacturing tolerances.

Ferromagnetic seals are generally vulnerable to leakage under thermal expansion conditions. On the other hand, pumping grooves have been shown to result in undesirable ingestion of ambient air during operation. Flow recirculation passages, either for localized lubricant flow, or for global flow throughout the structure of the bearing unit, involve considerable manufacturing difficulty and resultant high prime cost of the hydrodynamic bearing unit.

To be effective within a hard disk drive environment, the HDB system is typically configured to include radial hydrodynamic bearing regions formed between a shaft and a sleeve, and axial or thrust bearing regions formed between an annular disk or facing radial surfaces of the shaft and sleeve combination. One exemplary prior art example is presented in FIG. 1. Therein, a HDB system within a height-reduced, cantilevered spindle assembly for a hard disk drive includes a base 11, a bearing shaft 12 suitably secured within an opening in the base 11 as by press fitting and/or an anaerobic adhesive. Alternatively, the HDB system may be assembled as a separate component to a mounting flange, which is in turn mounted within an opening of the base 11. The particular mounting arrangement of the shaft 12 and the base 11 is conventional, and not a part of the present invention.

A sleeve 14 fits over the shaft in a precise arrangement. A disk hub 16 is secured to the sleeve 14 and supports e.g. 1–4 data storage disks in conventional fashion, the disks (and spacers) being retained between a lower flange 17 of the hub 16 and a disk clamp secured to the top of the hub in conventional fashion (the disks, spacers and clamp not being shown in FIG. 1). A DC brushless spindle motor includes a multi-coil armature assembly 20 secured to an annular wall 21 of the base 11. A permanent magnet ring 22 and a ferromagnetic flux-return ring 24 complete the brushless motor in this cantilevered motor design. A thrust plate 30 is secured to the shaft 12 e.g. by press-fitting or a screw, and defines two HDB surfaces 32 and 34 between a top plate 40 and a recessed radial wall of the sleeve 14, respectively. Radial bearings 36 and 38 are defined at spaced-apart locations of the, shaft 12 and the sleeve 14, as shown in FIG. 1, for example.

The HDB patterns are precision-formed by suitable forming techniques such as ball-forming for the radial bearings 36 and 38, e.g. as described in commonly assigned, copending U.S. patent application Ser. No. 08/353,171 by Shuo-Hao Chen, filed on Dec. 8, 1994, and entitled: "Method for Making Precision Self-Contained Hydrodynamic Bearing Assembly", the disclosure thereof being incorporated herein by reference. The HDB patterns at the thrust plate 32 may be conventionally formed as by etching or coining techniques.

Of principal interest in connection with the present invention, the prior HDB assembly 10 includes a lower axial capillary seal 42 formed between an inwardly tapered portion of the shaft 12 and a surrounding cylindrical wall portion of the sleeve 14 at a location below the radial bearing 38. Such a seal is shown and more completely discussed in U.S. Pat. No. 4,726,693 to Anderson et al., entitled: "Precision Hydrodynamic Bearing", the disclosure thereof being incorporated herein by reference. One significant drawback of this prior approach is that droplets may be released from the lubricant free surface which resides in the capillary seal 42 because of a shock force or other disturbance occurring while the motor 10 is at rest and settle or form at a location 43 at the lower juncture of the shaft 12 and sleeve 14. Later, when power is applied to the motor 10, resultant relative rotation between the sleeve 14 and shaft 12 creates a centrifugal force which drives the droplet along an annular gap 44 between the sleeve 14 and the annular wall 21 of the base, and results in leakage at the outer juncture 46 of the annular wall 21 and the sleeve 14. Droplets could also form during bearing operation, and centrifugal force-driven leakage similar to that described above could occur. The present invention overcomes this leakage problem.

Another significant drawback of the prior art is that the seal volume in the capillary seal 42 is relatively small compared with the total lubricant volume inside of the bearing unit because the capillary seal 42 is located at the inner diameter of the bearing unit. Under condtions of thermal expansion and/or variations of the lubricant filling tolerance, lubricant leakage can occur at the seal 42. The present invention also overcomes this drawback.

A hitherto unsolved need has remained for an improved HDB unit having seal which overcomes limitations including high prime cost and leakage/loss of lubricant.

SUMMARY OF THE INVENTION WITH OBJECTS

A general object of the present invention is to provide an improved seal for a HDB unit overcoming limitations and drawbacks of the prior art.

Another object of the present invention is to provide a leakage free and cost effective, Z-height reduced, cantilevered HDB motor assembly including a lower seal overcoming limitations and drawbacks of the prior art.

A further object of the present invention is to provide an improved HDB system for a disk spindle of a computer hard disk drive.

A more specific object of the present invention is to provide an HDB unit having a configuration which effectively contains its lubricant inside the bearing unit under all operating and non-operating conditions of a disk spindle and motor within a Z-height reduced hard disk drive.

A further object of the present invention is to take advantage of centrifugal force generated by relative rotation of elements of an HDB unit in order to provide an improved lubricant containment mechanism for containing the lubricant within the bearing.

A still further object of the present invention is to provide an HDB unit having a seal arrangement which provides a greater seal volume for HDB lubricant in order to accomodate tolerances due to thermal expansion during use, and lubricant filling operations during manufacture.

Yet another object of the present invention is to provide an HDB unit employing a single thrust plate at a proximal end of a shaft, and a leak-free capillary seal arrangement at a distal end of the shaft.

One more object of the present invention is to provide an axial-height reduced HDB spindle motor having effective lubricant sealing at a location away from a thrust ring which is readily manufacturable with reasonable tolerances and at modest cost.

An improved seal is provided for a hydrodynamic bearing unit which includes a shaft, a sleeve rotatably disposed over the shaft and providing a pair of spaced-apart hydrodynamic journal bearings in cooperation with the shaft, an annular axial thrust plate secured to the shaft to form a first hydrodynamic thrust bearing with the sleeve, and a second hydrodynamic thrust bearing with a top plate secured to the sleeve, the bearing unit being filled with a hydrodynamic bearing lubricant. The improved seal retains the hydrodynamic bearing lubricant and includes a seal ring secured to the shaft and extending radially outwardly of the pair of spaced-apart hydrodynamic journal bearings defined between the seal ring and the thrust plate. The seal ring adjacently faces adjacent radial and axial portions of the sleeve. An annular taper capillary seal is defined between a diverging outer wall surface of the seal ring and the adjacent axial portion of the sleeve. A containment ring extends from the sleeve to surround a radial wall portion of the seal ring adjacent to an opening of the taper capillary seal and forms a secondary containment seal opening toward the shaft for preventing escape of the hydrodynamic bearing lubricant. The surface of the hydrodynamic lubricant is placed within the annular taper capillary seal and is retained in place by capillary force in the absence of rotation, and is retained in place by capillary force and by centrifugal force in the presence of relative rotation between the shaft and the sleeve.

In one aspect of the present invention, the containment ring comprises a flanged ring member secured to an annular flange portion of the sleeve and preferably defines a containment groove adjacently facing an opening of the annular taper capillary seal and a tapered section radially divergent toward the shaft.

In another aspect of the present invention, the facing radial surfaces of the seal ring and the containment ring are treated with a barrier film to promote retention of the hydrodynamic lubricant within the HDB unit.

In a further aspect of the present invention, the annular taper capillary seal is an outer segment of a two-segment capillary seal, and radially diverging radial walls of the seal ring and the radial portion of the sleeve define an inner segment of the two-segment capillary seal.

In one more aspect of the present invention, radial walls of the seal ring and the radial portion of the sleeve define hydrodynamic pumping grooves for retaining the hydrodynamic lubricant within the bearing unit. In this aspect of the invention, a clearance may be maintained between the radial walls of the seal ring and the radial portion of the sleeve in a range substantially between 50 and 100 microns.

In a further aspect of the present invention, the hydrodynamic bearing unit comprises a Z-height constrained disk drive hub secured to the sleeve for supporting at least one data storage disk, and includes a DC brushless spindle motor having a stator of windings and magnetic gaps fixed relative to the shaft, and having a rotor comprising an annular magnet confronting the magnetic gaps and secured to a ferromagnetic flux return ring in turn secured to an inside cylindrical wall of the disk hub.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
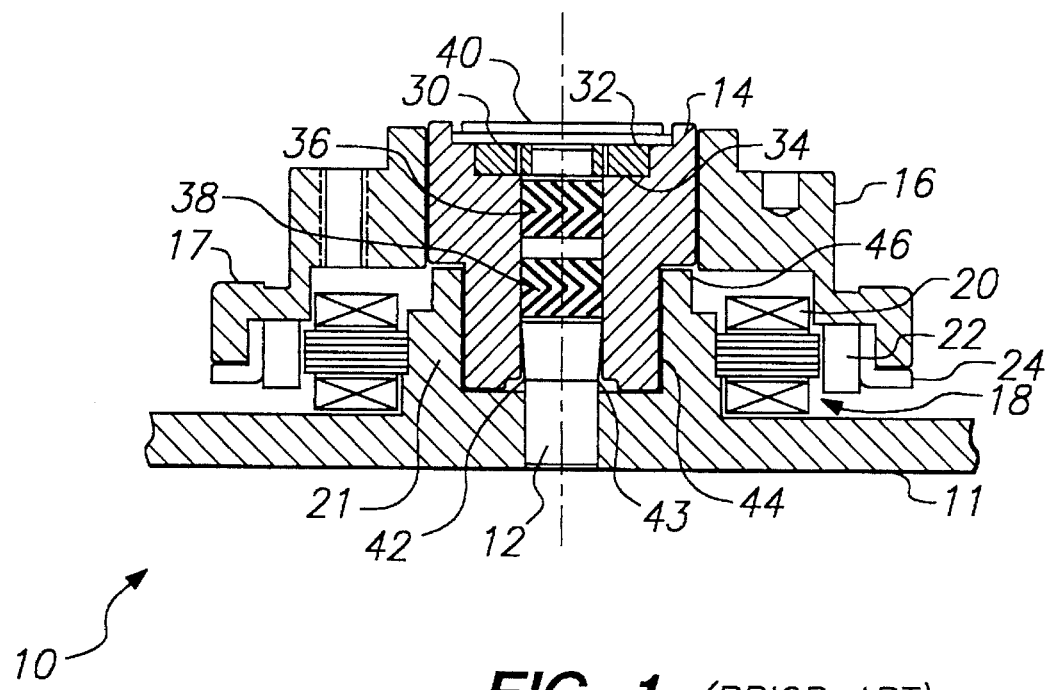
FIG. 1 is an enlarged, diagrammatic view in elevation and axial section of a conventional, Z-height-reduced hard disk drive HDB cantilevered spindle motor assembly in accordance with the prior art.
Figure 2:
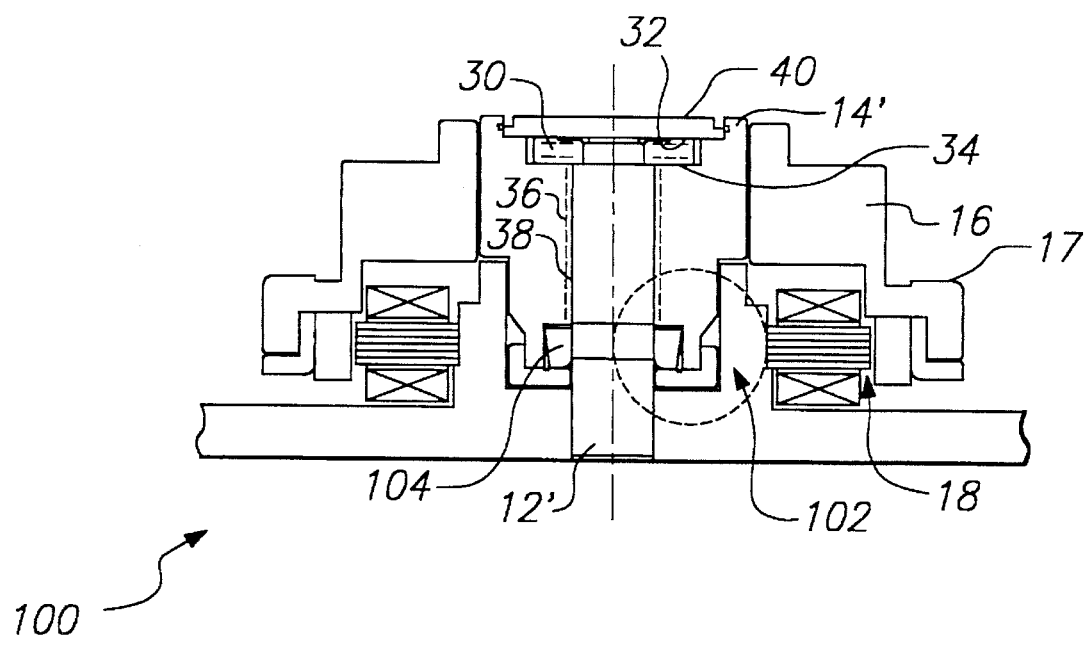
FIG. 2 is an enlarged, diagrammatic view in elevation and axial section of a Z-height reduced hard disk drive HDB cantilevered spindle motor assembly including a lower seal (shown in the circled region) incorporating principles of the present invention.

With reference to FIG. 2, an HDB unit 100 incorporating principles of the present invention includes many of the same structural features already discussed in conjunction with FIG. 1, above. Accordingly, those common elements bear the same reference numerals and are not discussed further. A lower seal 102 is depicted in the region enclosed by the broken circle in FIG. 2 As shown in FIG. 2, the lower seal includes a modified shaft 12' and a modified sleeve 14'; however, the shaft 12' and seal 14' form the same radial HDB regions 36 and 38, and employ a single annular thrust plate 30 to form the same axial HDB regions 32 and 34 as the prior bearing unit 10 of FIG. 1. The modified shaft 12' and thrust plate 30 may be formed of hardened, tempered steel alloy, while the modified sleeve 14' and top plate 40 may be formed of bronze alloy, for example.

Figure 3:
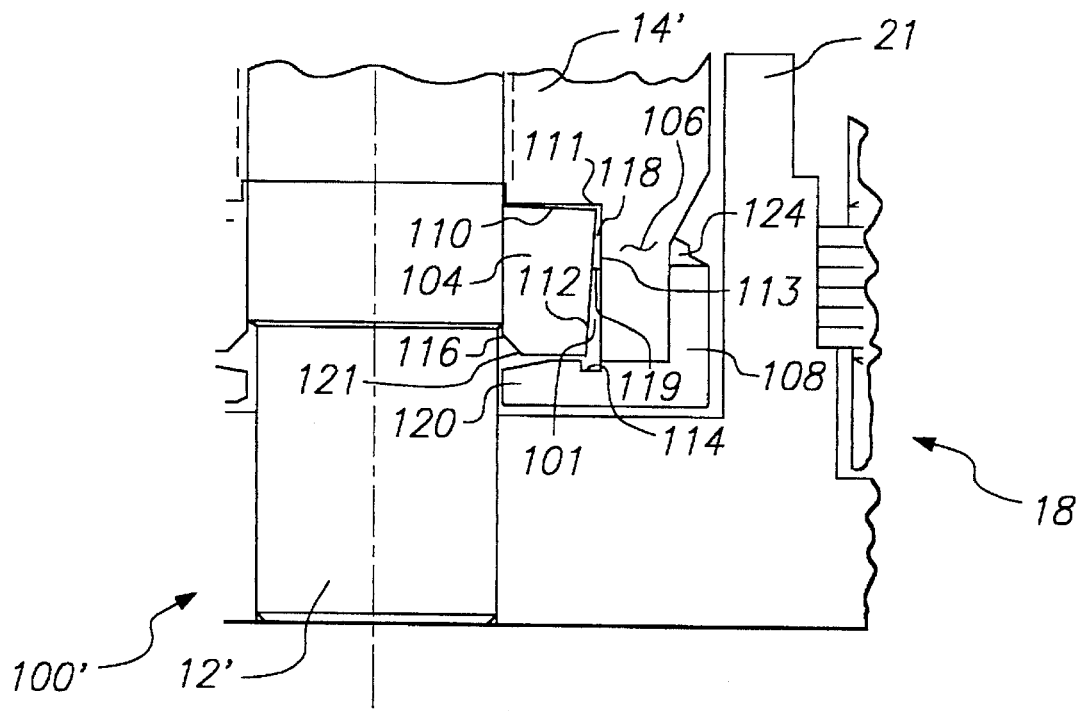
FIG. 3 is an enlargement of the circled portion of the FIG. 2 drawing at a lower lubricant seal region illustrating structural details of one preferred embodiment of a seal arrangement in accordance with principles of the present invention.

As shown in FIG. 2, the modified shaft 12' no longer defines a tapered region at the lower seal 42. Rather, the shaft 12' retains a substantially cylindrical outer surface at the vicinity of the lower sealing region to which a cylindrical sealing ring 104 is press fit onto the shaft 12' and then secured by a suitable adhesive. The rotating sleeve 14' is modified to define an annular flange portion 106 which depends downwardly and outwardly of the annular ring 104 in a closely spaced-away configuration as shown in FIG. 3, for example. A ranged dust cover/containment ring 108 fits over the annular flange portion 106 and is secured thereto by a suitable anaerobic adhesive. The containment ring 108 extends radially inwardly toward the shaft 12'.

In a first preferred embodiment depicted in FIG. 3, an HDB unit 100' provides a first preferred example of a lower shaft seal 101. In the unit 100', an upper radial surface 110 of the cylindrical sealing ring 104 is tapered to diverge radially with respect to an oppositely facing, radial wall portion 111 of the sleeve 14' in order to define a first, radial segment of the lower capillary seal 101 containing HDB lubricant 118. The lower capillary seal 101 is continued in a downwardly direction between an outer tapered face 112 of the sealing ring 104 and an oppositely facing cylindrical wall portion 113 of the flange portion 106 of the sleeve 14'. The face 112 diverges away from the cylindrical wall portion 113 to complete the capillary seal. The HDB bearing unit 100' is filled with lubricant 118 to a lower lubricant level as shown approximately midway along a length of the capillary seal segment defined by the walls 112 and 113.

The containment ring 108 may optionally define an annular groove or recess 114 which is aligned with a lower opening of the outer segment of the capillary seal 101 defined by the walls 112 and 113. In the event that a drop of lubricant 118 is lost from the lower seal or otherwise escapes, because of shock forces, etc., the lubricant drop settles in, and is contained within the recess 114. When the HDB unit 100' is rotated at its intended high operating speed, e.g. approximately 10,000 RPM or greater, the resultant centrifugal force will cause the drop to flow against the wall 113 and be returned to and assimilated into the pool of lubricant 118 within the seal 101. This effect may be enhanced by making the wall 113 slightly convergent toward the tapered face 112. A drop of lubricant may also be returned to the pool of lubricant 118 within the seal 101 by capillary force.

In the event of thermal expansion and/or variations in filling the HDB unit 100' with lubricant, a location of a lubricant surface 119 may vary inside the two segment capillary seal 101. However, since the capillary seal 101 is located at an outer diameter of the sealing ring 104, increased volume is available for the lubricant pool 118 and the lubricant surface 119 and lubricant volume may vary considerably without leaving the taper seal region 101.

The containment ring 108 includes a radially inward portion 120 adjacently facing a lower radial face of the seal ring 104, and thereby defining a small tapered secondary containment capillary trap 121 between the portion 120 and the seal ring 104. In the unlikely event that a drop of lubricant 118 escapes into the secondary containment trap 121, centrifugal forces will expel the drop and return it to the pool of lubricant 118 within the lower seal 101.

Figure 4:
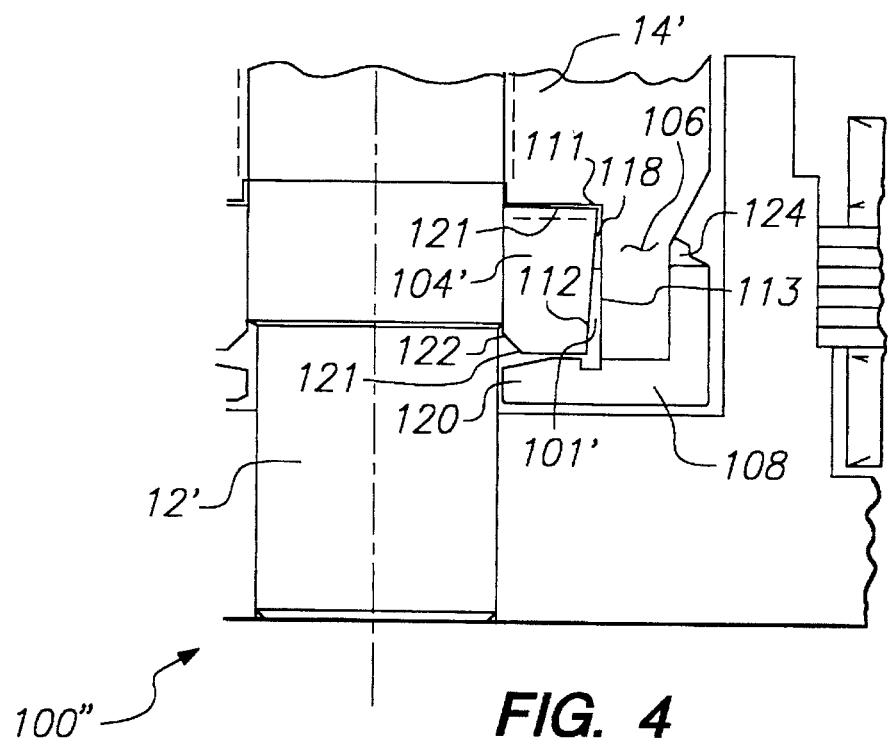
FIG. 4 is an enlargement of the circled portion of the FIG. 2 drawing at a lower lubricant seal region illustrating structural details of a second preferred embodiment of a seal arrangement in accordance with principles of the present invention.

A second, presently preferred embodiment 100" of the present invention is depicted in FIG. 4. Therein, a modified, single-segment lower capillary seal 101' is defined between a slightly modified seal ring 104' and the flange portion 106 of the sleeve 14'. In the FIG. 4 example 100", an upper radial wall 121 of the seal ring is made parallel with the opposite facing radial wall 111 of the sleeve 14'.

Hydrodynamic pumping grooves may be defined in the wall 121 to aid in maintaining the lubricant 118 within the bearing unit 100" during high speed rotation. The grooves may be formed in any conventional manner, as by etching or coining, and may be configured to have a small net pumping action toward-the shaft 12' and thrust plate 30 in order to overcome centrifugal pumping forces otherwise induced during relative rotation between the shaft 12' and the sleeve 14' of the unit 100". (The HDB units 100' and 100" may provide for a slight hydrodynamic net pumping action toward the thrust plate region, since the units 100' and 100" are sealed against lubricant loss at that end.)

Unlike the inventor's parent patent applications referenced above and specifically incorporated herein by reference, advantageously, the seal ring 104' is not called upon to provide significant resistance to axial displacement, which is provided by the conventional thrust plate 30 and HDB regions 32 and 34 at the upper end of the bearing unit. Accordingly, the clearance between the radial walls 111 and 121 may be on the order of 50 to 100 µm, rather than the much more stringent clearances of approximately 10–15 µm required between the thrust plate 30 and the opposite faces of the top cap 40 and sleeve 14 at the respective thrust HDB surfaces 32 and 34. The greater spacing between the seal ring 104' and the sleeve 14' provides greater tolerances and economies in the manufacturing process than is available when the seal ring is in fact a thrust HDB surface, as shown in the inventor's related U.S. Patent Applications noted above.

As shown in FIGS. 3 and 4, the seal ring 104, 104' may define a lower chamfer 122 which provides an ideal region for placement of a suitable anaerobic adhesive (e.g. Loctite™) for securing the ring 104, 104' to the shaft 12'. Also, a band of adhesive may also be emplaced between the containment ring 108 and the lower flange 106 of the sleeve 14' at a location 124.

As used herein, terms of relative orientation, such as upper or lower, are employed strictly in connection with the viewing orientation of the respective figures. If the items shown in the figures were reoriented, other relative position terms would be employed, depending upon the particular viewing orientation.

As may be appreciated upon consideration of the foregoing explanation, all of the objects of the present have been fully achieved, and in particular, an effective HDB lubricant seal is provided for a Z-height reduced (one inch or less) HDB unit within a disk spindle of a miniature 3.5 inch or smaller form factor, high performance disk drive. While specific examples of embodiments of the present invention have been given, it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. An improved seal for a hydrodynamic bearing unit including a shaft, a sleeve rotatably disposed over the shaft and defining a pair of spaced-apart hydrodynamic journal bearings in cooperation with the shaft, an annular axial thrust plate secured to the shaft to form a first hydrodynamic thrust bearing with the sleeve, and a second hydrodynamic thrust bearing with a top plate secured to the sleeve, the bearing unit being filled with a hydrodynamic bearing lubricant, the improved seal for containing the hydrodynamic bearing lubricant and including:

a seal ring secured to the shaft and extending radially outwardly of the pair of spaced-apart hydrodynamic journal bearings being defined between the seal ring and the thrust plate, the seal ring adjacently facing adjacent radial and axial portions of the sleeve, an annular taper capillary seal defined between a diverging outer wall surface of the seal ring and the adjacent axial portion of the sleeve, and a containment ring means extending from the sleeve to surround a radial wall portion of the seal ring adjacent to an opening of the taper capillary seal and forming a secondary containment sealing means opening toward the shaft for preventing escape of the hydrodynamic bearing lubricant, the hydrodynamic lubricant emplaced within the annular taper capillary seal and being retained in place by capillary force in the absence of rotation, and being retained in place by capillary force and by centrifugal force in the presence of relative rotation between the shaft and the sleeve.

2. The improved seal set forth in claim 1 wherein the containment ring means comprises a ranged ring member secured to an annular flange portion of the sleeve.

3. The improved seal set forth in claim 1 wherein the containment ring means defines a containment groove adjacently facing an opening of the annular taper capillary seal.

4. The improved seal set forth in claim 1 wherein the containment ring and the seal ring define a secondary containment radial taper capillary seal.

5. The improved seal set forth in claim 1 wherein facing surface portions of the containment ring and the seal ring are treated with a barrier film to promote retention of the hydrodynamic lubricant within the bearing unit.

6. The improved seal set forth in claim 1 wherein the annular taper capillary seal is an outer segment of a two-segment capillary seal, and wherein diverging radial walls of the seal ring and the radial portion of the sleeve define an inner segment of the two-segment capillary seal.

7. The improved seal set forth in claim 1 wherein radial walls of the seal ring and the radial portion of the sleeve define hydrodynamic pumping grooves for pumping the hydrodynamic lubricant into the bearing unit.

8. The improved seal set forth in claim 7 wherein a clearance between the radial walls of the seal ring and the radial portion of the sleeve lies in a range substantially between 50 and 100 microns.

9. The improved seal set forth in claim 1 wherein the hydrodynamic bearing unit comprises a Z-height reduced disk drive including a disk hub secured to the sleeve for supporting at least one data storage disk, and further comprising a DC brushless spindle motor having a stator of windings and magnetic gaps fixed relative to the shaft, and having a rotor comprising an annular magnet confronting the magnetic gaps and secured to a ferromagnetic flux return ring in turn secured to an inside cylindrical wall of the disk hub.

10. The improved seal set forth in claim 9 further comprising a DC brushless spindle motor having a stator coil assembly fixed to the base about the shaft, and having a rotating permanent magnet assembly secured to an inside annular wall of the hub.

11. An improved seal for a hydrodynamic spindle assembly of a hard disk drive spindle including a base, a shaft secured to the base, and a sleeve overlying the shaft and rotating relative to the shaft and base, the sleeve carrying a disk hub, the shaft and sleeve defining a plurality of spaced apart hydrodynamic journal bearings, a thrust plate secured to the shaft and having a first radial surface in facing confrontation with a shoulder of the sleeve and defining a first hydrodynamic thrust bearing, a thrust bushing secured to the sleeve and having a bearing surface in overlying facing engagement with a second radial surface of the thrust plate and defining a second hydrodynamic thrust bearing, the improved seal for containing hydrodynamic bearing lubricant and including:

a seal ring secured to a region of the shaft adjacent to the base and extending radially outwardly of the plurality of spaced-apart hydrodynamic journal bearings, the seal ring adjacently facing adjacent radial and axial portions of the sleeve, an annular taper capillary seal defined between a diverging outer wall surface of the seal ring and the adjacent axial portion of the sleeve, and a containment ring means extending from the sleeve to surround a radial wall portion of the seal ring adjacent to an opening of the taper capillary seal and forming a secondary containment sealing means opening toward the shaft for preventing escape of the hydrodynamic bearing lubricant, the hydrodynamic lubricant emplaced within the annular taper capillary seal and being retained in place by capillary force in the absence of rotation, and being retained in place by capillary force and by centrifugal force in the presence of relative rotation between the shaft and the sleeve.

\* \* \* \* \*